(12) United States Patent
Wang

(10) Patent No.: US 10,774,836 B2
(45) Date of Patent: Sep. 15, 2020

(54) THIN-WALL-LONG-SHAFT-LOW-NOISE TRANSMISSION MECHANISM FOR PEDESTAL PUMPS

(71) Applicant: GP Enterprises Co., Ltd, Suzhou, Jiangsu (CN)

(72) Inventor: Xian Wang, Jiangsu (CN)

(73) Assignee: GP Enterprises Co., Ltd, Suzhou (CN)

( * ) Notice: Subject to any disclaimer, the term of this patent is extended or adjusted under 35 U.S.C. 154(b) by 0 days.

(21) Appl. No.: 16/358,759

(22) Filed: Mar. 20, 2019

(65) Prior Publication Data

US 2019/0360494 A1    Nov. 28, 2019

Related U.S. Application Data

(63) Continuation of application No. PCT/CN2018/091317, filed on Jun. 14, 2018.

(30) Foreign Application Priority Data

May 25, 2018   (CN) ..................... 2018 2 0789055 U

(51) Int. Cl.
*F04D 13/08*   (2006.01)
*F16C 3/02*    (2006.01)
*F16D 1/10*    (2006.01)

(52) U.S. Cl.
CPC ............... *F04D 13/08* (2013.01); *F16C 3/02* (2013.01); *F16D 1/10* (2013.01); *F16D 2001/102* (2013.01)

(58) Field of Classification Search
CPC ...... F04D 13/08; F04D 29/043; F04D 29/044; F04D 29/053; F04D 29/054; F16C 3/02; F16D 1/10; F16D 2001/102; F16D 1/0858

See application file for complete search history.

(56) References Cited

FOREIGN PATENT DOCUMENTS

CN   204941970 U   *   1/2016
CN   204941970 U       1/2016

* cited by examiner

*Primary Examiner* — Eldon T Brockman

(57) ABSTRACT

The invention discloses a thin-wall-long-shaft-low-noise transmission mechanism for pedestal pumps, which includes a stainless steel pipe, a first bushing and a second bushing, a pump body, an impeller and a motor, the motor is arranged above the stainless steel pipe, the first and second bushings are embedded at first and second ends of the stainless steel pipe respectively, the impeller includes an impeller hub shaft, the motor includes a motor shaft, the impeller hub shaft passed through the pump body and connected to the first bushing which is embedded in the first end of the stainless steel pipe. Through the above solution, the machining precision of the thin wall stainless steel pipe is higher than that of a solid metal shaft and a plastic shaft, the strength is higher than that of a plastic shaft, and the noise is reduced when the pump is working.

4 Claims, 2 Drawing Sheets

THIN-WALL-LONG-SHAFT-LOW-NOISE TRANSMISSION MECHANISM FOR PEDESTAL PUMPS

CROSS REFERENCE TO RELATED APPLICATIONS

The present application is a Continuation Application of PCT Application No. PCT/CN2018/091317 filed on Jun. 14, 2018, which claims the benefit of Chinese Patent Application No. 201820789055.9 filed on May 25, 2018. All the above are hereby incorporated by reference.

TECHNICAL FIELD

The present invention relates to a water pump, and specifically relates to a pedestal pump which belongs to the technical field of water pump.

BACKGROUND OF THE INVENTION

Generally, the overall structure of a pedestal pump is that the impeller pump body is submerged in water, the motor is above the water surface, the motor shaft and impeller needs to be connected by a long shaft and a coupling to achieve transmission thereof. The traditional driving shaft is a solid metal shaft or a hollow alloy plastic pipe, the longer the shaft is, the worse the machining accuracy will be, and the higher the cost will be, especially when the alloy plastic shaft is used for a period time, deformation will occur and friction will happen on the outer tube, this causes noise or failure in the operation of the pump.

SUMMARY OF THE INVENTION

The purpose of the present invention is to provide a thin-wall-long-shaft-low-noise transmission mechanism for pedestal pump with that the pump will operate with less noise.

The technical solution of the present invention is to provide a thin-wall-long-shaft-low-noise transmission mechanism for pedestal pumps, which includes a stainless steel pipe, a first bushing and a second bushing, a pump body, an impeller and a motor, the motor is arranged above the stainless steel pipe, the pump body is arranged below the stainless steel pipe, the first and second bushings are embedded at first and second ends of the stainless steel pipe respectively, the impeller includes an impeller hub shaft, the motor includes a motor shaft, the impeller hub shaft passed through the pump body and connected to the bushing which is embedded in one end of the stainless steel pipe, the motor shaft is connected to the bushing which is embedded in another end of the stainless steel pipe, the outer side of the wall of the bushing is provided with several grooves, at least one stamped rib corresponding to the grooves of each bushing is provided on the inside of the wall of the stainless steel pipe, the stamped rib of the stainless steel pipe is pressed into the groove of the bushing.

In a preferred embodiment of the present invention, the stainless steel pipe is a thin-wall stainless steel pipe.

In a preferred embodiment of the present invention, the connection portion of the impeller hub shaft and the connection portion of the motor shaft are designed as a "D" shape or a circle shape in cross section.

In a preferred embodiment of the present invention, the inner periphery of the bushing is designed as a circle shape or a "D" shape in cross section.

In a preferred embodiment of the present invention, the way in which the bushing connected to the impeller hub shaft and to the motor shaft are thread set screw fastened or interference fit tightened.

The present invention provides a thin-wall-long-shaft-low-noise transmission mechanism for pedestal pumps, the machining precision of the thin-wall stainless steel pipe is higher than that of a solid metal shaft and a plastic shaft, the strength is higher than that of a plastic shaft, and the noise is reduced when the pump is working.

BRIEF DESCRIPTION OF THE FIGURES

In order to more clearly illustrate the technical solutions in the embodiments of the present invention, the drawings used in the description of the embodiments will be briefly described below. Obviously, the drawings in the following description are merely some embodiments of the present invention. For those who skilled in the art, other drawings may also be obtained based on these drawings without paying any creative work. Therein.

DETAILED DESCRIPTION

The following clearly and completely describes of the technical solutions in the embodiments of the present invention, obviously the embodiment described is only one part of the embodiment of the present invention and not the whole embodiment. Based on the embodiments in the present invention, all other embodiments obtained by ordinary technicians in the field without creative labor are within the scope of protection of the present invention.

Figure 1:
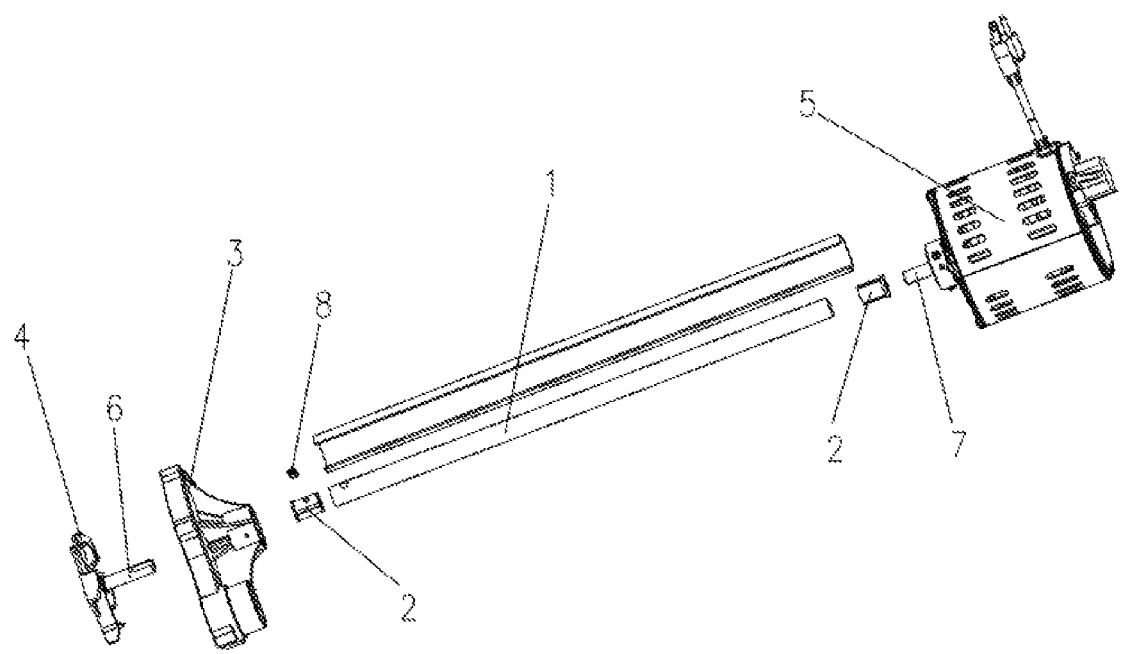
FIG. 1 is an explosion structural view of a thin-wall-long-shaft-low-noise transmission mechanism for pedestal pumps according to the present invention.
Figure 2:
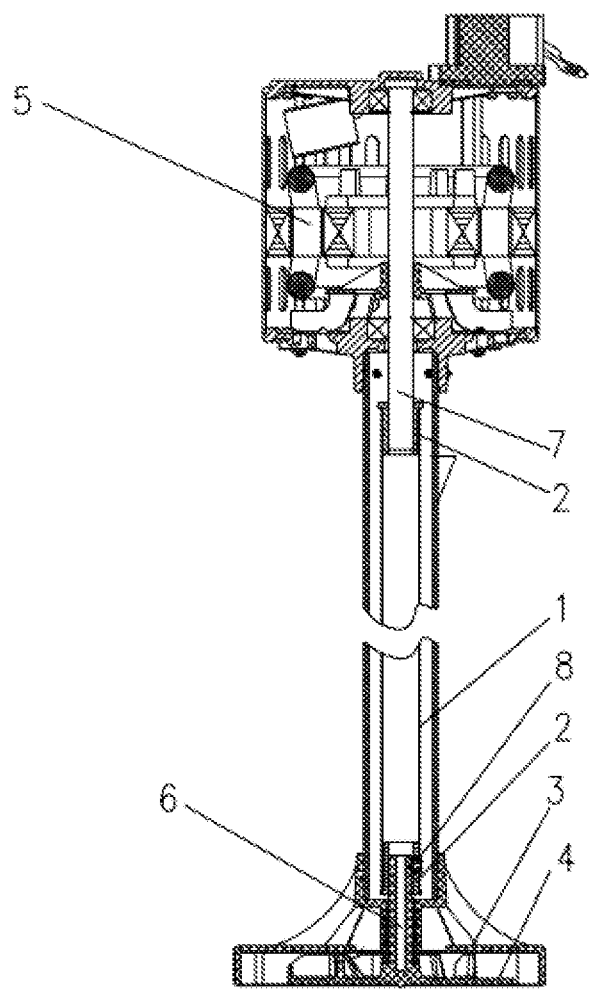
FIG. 2 is a cross section view of a thin-wall-long-shaft-low-noise transmission mechanism for pedestal pumps according to the present invention.

Referring to FIGS. 1-2, the embodiment of the present invention includes:

A thin-wall-long-shaft-low-noise transmission mechanism for pedestal pumps which includes a stainless steel pipe 1, a first and second bushings 2, a pump body 3, an impeller 4 and a motor 5, the motor 5 is arranged above the stainless steel pipe 1, the pump body 3 is arranged below the stainless steel pipe 1, the first and second bushings 2 are embedded at first and second ends of the stainless steel pipe 1 respectively, the impeller 4 includes an impeller hub shaft 6, the motor 5 includes a motor shaft 7, the impeller hub shaft 6 goes through the pump body 3 and connected to the first bushing 2 which is embedded in the first end of the stainless steel pipe 1 via a threaded set screw 8, the motor shaft 7 is connected to the second bushing 2 which is embedded in the second end of the stainless steel pipe 1 in a connection way of interference fit, the outer side of the wall of each bushing 2 is provided with a plurality of grooves, at least one stamped rib corresponding to the plurality of grooves of each bushing 2 is provided on the inside of the wall of the stainless steel pipe 1, the stamped rib of the stainless steel pipe 1 is pressed into the plurality of grooves of each bushing 2.

The working principle of the transmission mechanism for pedestal pumps: submerge the impeller 4 and pump body 3 into water, the motor 5 is above the water surface, the motor shaft 7 and the impeller 4 are connected by the stainless steel pipe 1 to achieve transmission and thereby pumping of water. The stainless steel pipe 1 is a thin wall stainless steel pipe, which can greatly reduce cost, and improve precision. The connection way between the bushing 2 to and the impeller hub shaft 6 or to the motor shaft 7 may be by tightening with threaded set screw 8 or by interference fit connection. By using these ways, the motor shaft 7 is connected to impeller hub shaft 6. The bushing 2 has several grooves on the outer side of its wall, and the stainless steel pipe 1 has at least one stamped rib that connects with the grooves on the outer side of the wall of the bushing 2. Press the stamped rib of the stainless steel pipe 1 into the groove of the bushing 2 to ensure that the bushing 2 does not move in the stainless steel pipe 1.

Summary, the present invention provides a thin-wall-long-shaft-low-noise transmission mechanism for pedestal pumps, the machining precision of thin wall stainless steel pipe is higher than that of a solid metal shaft and a plastic shaft, the strength is higher than that of a plastic shaft and the noise of the pump decreases when working.

The foregoing descriptions are merely embodiments of the present invention, and therefore do not mean to limit the scope of the present invention. Any implementation on the content of the present specification by using an alternative structure or equivalent process transformation without any creative labor should be covered within the scope of protection of the present invention. Therefore, the scope of protection of the invention shall be subject to the scope of protection specified in the patent claim.

What is claimed is:

1. A transmission mechanism for pedestal pumps, comprising:

a stainless steel pipe;

a motor arranged above the stainless steel pipe;

a pump body arranged below the stainless steel pipe;

first and second bushings embedded in first and second ends of the stainless steel pipe respectively; and an impeller including an impeller hub shaft, wherein the motor includes a motor shaft, the impeller hub shaft passed through the pump body and connected to the first bushing which is embedded in the first end of the stainless steel pipe, the motor shaft connected to the second bushing which is embedded in the second end of the stainless steel pipe, wherein an outer side of a wall of each of the first and second bushings is provided with a plurality of grooves, at least one stamped rib corresponding to the plurality of grooves of each bushing is provided on an inner side of a wall of the stainless steel pipe, the at least one stamped rib of the stainless steel pipe is pressed into the plurality of grooves of each bushing.

2. The transmission mechanism for pedestal pumps according to claim 1, wherein a connection portion of the impeller hub shaft and a connection portion of the motor shaft are "D" shape or a circular shape in cross section.

3. The transmission mechanism for pedestal pumps according to claim 1, wherein an inner periphery of each of the first and second bushings is circular shape or "D" shape in cross section.

4. The transmission mechanism for pedestal pumps according to claim 1, wherein the bushings are connected to the impeller hub shaft and to the motor shaft by threaded set screws or interference fit.

* * * * *